US006841601B2

United States Patent
Serpico et al.

(10) Patent No.: US 6,841,601 B2
(45) Date of Patent: Jan. 11, 2005

(54) CROSSLINKED POLYMER ELECTROLYTE MEMBRANES FOR HEAT AND MOISTURE EXCHANGE DEVICES

(75) Inventors: Joseph M. Serpico, Palm Harbor, FL (US); Scott G. Ehrenberg, New Port Richey, FL (US); Gary Wnek, Midlotman, FL (US)

(73) Assignee: Dais-Analytic Corporation, Odessa, FL (US)

(*) Notice: Subject to any disclaimer, the term of this patent is extended or adjusted under 35 U.S.C. 154(b) by 0 days.

(21) Appl. No.: 10/268,039

(22) Filed: Oct. 9, 2002

(65) Prior Publication Data

US 2003/0118887 A1 Jun. 26, 2003

Related U.S. Application Data (63) Continuation-in-part of application No. 10/098,928, filed on Mar. 13, 2002, now abandoned.
(60) Provisional application No. 60/275,459, filed on Mar. 13, 2001, and provisional application No. 60/327,746, filed on Oct. 9, 2001, now abandoned.

(51) Int. Cl.$^7$ .............................................. C08L 5/54
(52) U.S. Cl. ..................... 524/261; 524/266; 524/264; 524/269; 524/434; 524/413; 525/539; 525/479; 525/535
(58) Field of Search ............................... 524/264, 261, 524/269

(56) References Cited

U.S. PATENT DOCUMENTS

| 4,728,429 A | 3/1988 | Cabasso et al. | 210/638 |
| 5,252,654 A | * 10/1993 | David et al. | 524/414 |
| 5,868,966 A | * 2/1999 | Wei et al. | 252/500 |
| 6,110,616 A | 8/2000 | Sheikh-Ali et al. | 429/33 |
| 6,145,588 A | 11/2000 | Martin et al. | 165/166 |
| 6,346,574 B1 | * 2/2002 | Nishihara | 525/132 |

FOREIGN PATENT DOCUMENTS

| EP | 0 442 677 A2 | * 8/1991 | ........... B01D/53/22 |
| EP | 1 052 458 A2 | 11/2000 | |
| FR | 2 287 933 | 5/1976 | |
| WO | WO 02/09850 A2 | 2/2002 | |

* cited by examiner

Primary Examiner—David W. Wu
Assistant Examiner—Rip A Lee
(74) Attorney, Agent, or Firm—Heslin Rothenberg Farley & Mesiti P.C.; Mary Louise Gioeni, Esq.

(57) ABSTRACT

A unitary humidity exchange cell (HUX) is dislosed that includes at least one composite membrane, disposed between at least one first chamber for flow of the first fluid therethrough and at least one second chamber for flow of the second fluid therethrough. The composite membrane include an at least partially sulfonated humidity-conducting polymer comprising residues derived from at least one arylvinyl monomer; and a reinforcing substrate bonded thereto. The product finds utility in a variety of physical and chemical processes and products whereby moisture or other highly polar liquid or gas transfer, exchange removal or delivery is important. A notable application is the Membrane Energy Recovery Ventilator (MERV) in which both heat, ions and moisture is transferred between two air streams, one intake and one exhaust, from an air-conditioned building.

16 Claims, 3 Drawing Sheets

CROSSLINKED POLYMER ELECTROLYTE MEMBRANES FOR HEAT AND MOISTURE EXCHANGE DEVICES

CROSS-REFERENCE TO RELATED APPLICATIONS

This application claims priority from U.S. provisional application, Ser. No. 60/327,746, filed Oct. 9, 2001 now abandoned, and U.S. non-provisional application, Ser. No. 10/098,928, filed Mar. 13, 2002 now abandoned, which claimed priority from U.S. provisional applications 60/275,459, filed Mar. 13, 2001, and No. 60/327,746, filed Oct. 9, 2001.

FIELD OF THE INVENTION

The invention relates to devices and apparatus for transfer of heat, ions and water between fluids, via a composite polymer membrane.

BACKGROUND OF THE INVENTION

A unitary humidity exchange cell (or HUX), as the name implies, is an element of a device that is capable of transferring water or other highly polar liquid or gas from one side of the cell to the other by action of a difference in some quantity or gradient across said cell. A key operational characteristic of the HUX cell is that a difference of some intensive or extensive property of the system (relative to the surrounding) leads to a gradient change of said property to effect mass transfer of water or some other highly polar liquid or gas from one side of the membrane to the other with or without an accompanying flow of electrons, protons, ions or molecules other than said water or other highly polar liquid or gas. It is under the influence of this property that exchange in liquid water or some other highly polar liquid or gas occurs across the permaselective membrane. This transfer of water or some other highly polar liquid or gas may or may not be accompanied by evaporation of said water or other highly polar liquid or gas into (or from) the stream by the absorption of heat or adiabatically or by some other thermodynamic means; for example the condensation or evaporation of liquid water or some other highly polar liquid or gas or the simple diffusion of water or some other highly polar liquid or gas into a pure liquid stream. A finite gradient across the membrane must exist in some quantity; examples are vapor pressure, osmotic or hydrostatic pressure, chemical, thermochemical, electrochemical, magnetochemical potential, as well as thermal (temperature or heat content), electric, electromagnetic, thermoelectric, or electrothermal potential difference. There must be at least two streams, one supplied to each surface of said membrane by some means either as a liquid or vapor flow each of which differs in at least one identical property of the system. The system attempts to reach a thermodynamic equilibrium by transporting water or some other highly polar liquid or gas from one stream to the other. The orientation of the streams to one another is considered arbitrary for the invention; these may be counter flow, coflow, crossflow, mixed flow or any other geometric arrangement of one or more streams. Water or some other highly polar liquid or gas transport (e.g. hydrodynamic, electrohydrodynamic, magnetohydrodynamic, diffusion, migration, or convection) occurs until the imposed gradient can no longer meet the physicochemical constraints of the system required to sustain the motion. In many cases, the exchange of water or some other highly polar liquid or gas between the streams is slow, but this may be due to some other limiting factor, such as, boundary layer effects, concentration polarization, hydrostatic pressure lag or gravity, surface tension effects, and convective or frictional effects. However, once these engineering design or system effects are minimized, inevitably, the exchange or transport of water or some other highly polar liquid or gas is rate-limiting if the permeability of the membrane to water or some other highly polar liquid or gas is poor. Hence, an important object of the invention is that hydrophilic polymer membrane has high permeability to water or some other highly polar liquid or gas; more than necessary for most applications. The hydrophilic polymer membrane (or formulation) must be mechanically supported and there must be means to supply the two streams to said surfaces. A second object of the invention is that the three sub-elements be fabricated as one unit by conventional means at low cost. This requires that the hydrophilic polymer wet the support, achieve intimate contact and demonstrate exceptional adhesion to it. Therefore, a third object of the invention is that the support be a polyolefin or blend thereof such that one component of said hydrophilic polymer is similar in chemical structure to one component of the support.

HUX cell design is general in that water (liquid or vapor) or other highly polar material (liquid or vapor) can be transferred between any two fluids. Examples of applications are per-vaporation, humidification and dehumidification of fuel cell streams in stacks and devices, drying gases at pressure, tertiary oil recovery, process control for chemical manufacture of chemicals for which water is a reactant, isolation of minerals from mining fluids, industrial separation of oil-water emulsions, microfiltration and ultrafiltration of colloidal suspensions and biological or organic macromolecules for purification, maintaining water content of methanol in direct methanol fuel cells, reverse osmosis for isolation of fresh water from brine, electrolysis cells, dialysis, electro-dialysis, piezo-dialysis, electro-osmosis and chloro-alkali cells.

SUMMARY OF THE INVENTION

The present invention relates to cells for transferring heat, ions and/or moisture between a first fluid and a second fluid. Such a cell comprises at least one composite membrane, disposed between at least one first chamber for flow of the first fluid therethrough and at least one second chamber for flow of the second fluid therethrough; whereby heat and moisture is transferable between the first fluid and second fluid via the composite membrane. The composite membrane may comprise an at least partially sulfonated humidity-conducting polymer comprising residues derived from at least one arylvinyl monomer; and a reinforcing substrate bonded thereto. The cell may additionally include at least one spacer disposed on a surface of the composite membrane. The spacer(s) may have a dimension normal to the surface of the composite membrane corresponding to a height of the first chamber; the longitudinal axis of the at least one spacer may be oriented parallel to a direction of flow of the first fluid in the first chamber. The direction of flow of the first fluid in the first chamber may be orthogonal to a direction of flow of the second fluid in the second chamber, or it may be opposite to it. In some embodiments, a plurality of synthetic polymer ribs are used as spacers; in others, the spacer is merely a bead of an adhesive composition; in still others, the spacer is a corrugated sheet composed of paper or plastic. The invention also relates to cell containing a plurality of composite membranes, and a plurality of alternating first chambers and second chambers, each separated by a composite membrane. The reinforcing substrate of the composite membrane may be a nonwoven fabric, composed of synthetic fibers, particularly one or more polyolefins. The humidity-conducting polymer of the composite membrane may include an additive selected from the group of antioxidants, biocides, flame retardants, uv stabilizers, hydrophilic plasticizers, and mixtures thereof, particularly, antioxidant(s), biocide(s), and flame retardant (s). The humidity-conducting polymer may be crosslinked using a peroxide initiator and an organometallic enolate coupling agent, particularly, 1,1-di-(tert-butylperoxy)-3,3,5-trimethylcyclohexane and aluminum acetoacetonate, or 2,5-dimethyl-2,5-di(t-butylperoxy)hexyne-3 and aluminum acetoacetonate.

In another aspect, the invention relates to organic-inorganic hybrid material and membranes for transferring heat, ions and moisture comprising these. Such membranes may function as proton transfer membranes in fuel, in addition to the applications listed above.

DETAILED DESCRIPTION OF THE INVENTION

Figure 1:
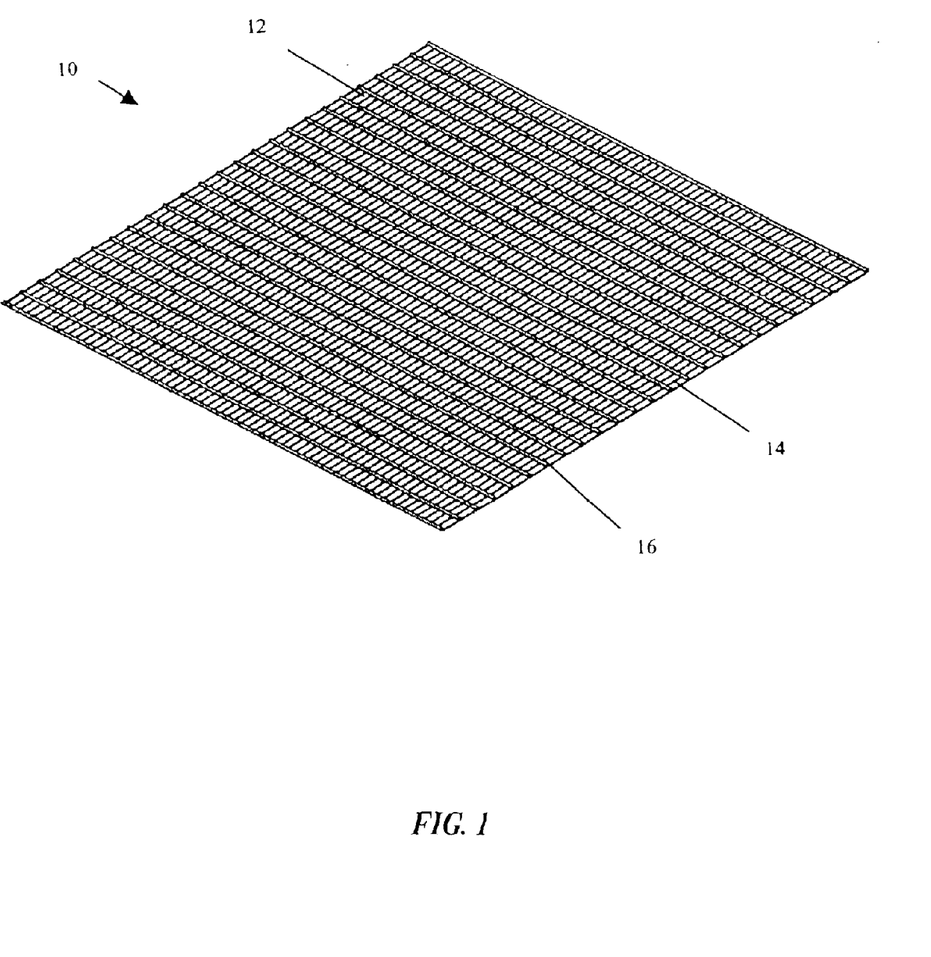
FIG. 1 shows a composite membrane for use in a humidity exchange cell according to present invention.

FIG. 1 shows a single composite membrane 10 for use in a humidity exchange cell according to the present invention. The membrane includes a continuous film of a humidity-conducting polymer 12 bonded to a reinforcing substrate 14 in the form of a cross-laid mesh or netting. Reinforcing substrate 14 strengthens the membrane so it can be handled, and allows the membrane to withstand pressure differentials without deflecting. As shown in FIG. 1, there are spacers, ribs or ridges 16 adhered to the surface of membrane 10 and running in one direction. The other side of the membrane is a smooth surface of humidity-conducting polymer 12. The height of spacer 16 sets the layer-to-layer spacing. Air channels in the humidity exchange cell are formed by spacers 16 when they rest against the smooth surface of the membrane that is placed on top of it.

The humidity-conducting polymer may be an at least partially sulfonated copolymer comprising residues derived from at least one arylvinyl monomer. Accordingly, the polymer includes repeating units of formula III, derived from an arylvinyl monomer, in addition to one or both of the repeating units of formulas I and II, derived from olefin monomers.

wherein $R^1$, $R^2$, $R^3$, $R^4$ are chosen independently from the group consisting of hydrogen, nitrile, phenyl and lower alkyl; $R^5$ is hydrogen, chlorine or lower alkyl; $R^6$ is hydrogen or methyl; $R^7$ is —COOH, —SO$_3$H, —P(O)(OR$^8$)OH, —R$^9$—COOH, —R$^9$—SO$_3$H, —R$^9$—P(O)(OR$^8$)OH; $R^8$ is hydrogen or lower alkyl, $R^9$ is lower alkylene; Ar is phenyl; and m, n, p, and q are zero or integers from 50 to 10,000.

The humidity-conducting polymer may be a block, graft or statistical copolymer derived from arylvinyl monomers. Some suitable polymers are described in U.S. Pat. Nos. 5,468,574; 5,679,482; and 6,110,616; the disclosure of each of these is incorporated by reference herein in its entirety. Block and graft copolymers contain relatively long segments made up of a homopolymer derived from one of the comonomers. In contrast, the term "statistical" is used herein to refer to polymers that do not contain long segments made up of homopolymer, and to distinguish these from block and graft copolymers. Preferably, the statistical polymers do not contain more than 15 percent of the total amount of arylvinyl monomer in blocks of arylvinyl monomer of more than 3 units. More preferably, the statistical polymers are not characterized by a high degree of either isotacticity or syndiotacticity. This means that in the carbon-13 NMR spectrum of the statistical polymer the peak areas corresponding to the main chain methylene and methine carbons representing either meso diad sequences or racemic diad sequences should not exceed 75 percent of the total peak area of the main chain methylene and methine carbons.

A statistical copolymer is a well-defined term of art (see G. Odian, Principles of Polymerization, 1991), and the use of the term herein is consistent with the commonly understood usage. Statistical copolymers are derived from the simultaneous polymerization of two monomers and have a distribution of the two monomer units along the copolymer chain that follows Bernoullian (zero-order Markov), or first or second order Markov statistics. The polymerization may be initiated by free radical, anionic, cationic or coordinatively unsaturated (e.g., Ziegler-Natta catalysts) species. According to Ring et al., (Pure Appl. Chem., 57, 1427, 1985), statistical copolymers are the result of elementary processes leading to the formation of a statistical sequence of monomeric units (that) do not necessarily proceed with equal probability. These processes can lead to various types of sequence distributions comprising those in which the arrangement of monomeric units tends toward alternation, tends toward clustering of like units, or exhibits no ordering tendency at all. Bernoullian statistics is essentially the statistics of coin tossing; copolymers formed via Bernoullian processes have the two monomers distributed randomly and are referred to as random polymers. For example, it is possible in a free radical copolymerization for the active end, in the case of one embodiment, a styryl or butadienyl radical, to have essentially no selectivity for styrene vs. butadiene. If so, the statistics will be Bernoullian, and the copolymer obtained will be random. More often than not, there will be a tendency for the propagating chain end to have some selectivity for one monomer or the other. In rare cases block copolymers can be derived from the simultaneous copolymerization of two monomers when the preference of the propagating chain ends for adding the opposite monomers is very low. The resulting polymer would be categorized as a block copolymer for the purposes of the present invention.

Statistical copolymers generally display a single glass transition temperature. Block and graft copolymers typically display multiple glass transitions, due to the presence of multiple phases. Statistical copolymers are, therefore, distinguishable from block and graft copolymers on this basis. The single glass transition temperature reflects homogeneity at the molecular level. An additional consequence of this homogeneity is that statistical copolymers, such as those of styrene and butadiene, when viewed by electron microscopy, display a single phase morphology with no microphase separation. In contrast, block and graft copolymers of styrene/butadiene, for example, are characterized by two glass transition temperatures and separation into styrene-rich domains and butadiene-rich domains. It should be noted that membranes of the invention which are produced from statistical copolymers originally having a single glass transition temperature and a single phase morphology do not necessarily exhibit a single phase morphology or a single glass transition temperature after sulfonation because of chemical changes in the polymer effected by the sulfonation, in combination with the physical changes effected by the casting processes of the invention.

The humidity-conducting polymers for use in the humidity exchange cells of the present invention are derived from the polymerization of arylvinyl monomers and which, therefore, contain pendant aryl or aromatic moieties. Arylvinyl monomers are defined herein as monomers that contain a vinyl group substituted with an aryl, haloaryl or alkyl-substituted aryl group. An example of a monomer containing a vinyl group substituted with an aryl is styrene, an example of a monomer containing a vinyl group substituted with a haloaryl group is chlorostyrene, and examples of monomers containing a vinyl group substituted with an alkyl-substituted aryl group are p-octylstyrene and vinyl toluene. One or more arylvinyl monomers may be copolymerized with olefin comonomers to produce a polymer which may be sulfonated; the resulting sulfonated copolymers may be used to form the membranes of the present invention.

Suitable arylvinyl monomers that can be employed to prepare the polymers for sulfonation include, for example, styrene, vinyl toluene, α-methylstyrene, t-butyl styrene, chlorostyrene and all isomers of these compounds. Particularly suitable such monomers include styrene and lower alkyl- or halogen-substituted derivatives thereof. Preferred monomers include styrene, α-methyl styrene, the lower alkyl-($C_1$—$C_4$) or phenyl-ring substituted derivatives of styrene, such as for example, ortho-, meta-, and para-methylstyrene, the ring halogenated styrenes, para-vinyl toluene or mixtures thereof, and the like. A more preferred arylvinyl monomer is styrene. Residues derived from vinyl toluene and chlorostyrene may be less readily sulfonated than those from styrene; therefore, it may be desirable to include utilize vinyl toluene and chlorostyrene along with arylvinyl monomers that result in residues that may be more readily sulfonated, such as styrene or α-methyl styrene, rather than as the sole arylvinyl component of the polymer. The aryl or aromatic moieties may be sulfonated at one or more positions on the aromatic rings to yield polymer chains having pendant aryl sulfonate groups.

Humidity-conducting polymers may also include residues derived from at least one olefin monomer, in addition to those derived from at least one arylvinyl monomer. Preferred olefin monomers include monoolefins, such as α-olefins and strained ring olefins, and diolefin monomers such as butadiene and isoprene. α-Olefins include ethylene and $C_{3-10}$ olefins having ethylenic unsaturation in the α- or 1-position, such as ethylene, propylene, butylene, and isobutylene. Suitable α-olefins include for example, α-olefins containing from 3 to about 20, preferably from 3 to about 12, more preferably from 3 to about 8 carbon atoms. Particularly suitable are ethylene, propylene, butene-1,4-methyl-1-pentene, 1-hexene or 1-octene or ethylene in combination with one or more of propylene, 1-butene, 4-methyl-1-pentene, 1-hexene or 1-octene. These α-olefins do not contain an aromatic moiety. Preferred monoolefin monomers are ethylene, propylene, 1-butene, 2-butene, 1-pentene, 4-methyl-1-pentene, 1-hexene, and 1-octene. Preferred strained ring olefins are the various isomeric vinyl-ring substituted derivatives of cyclohexene and substituted cyclohexenes, norbornene and $C_{1-10}$ alkyl or $C_{6-10}$ aryl substituted norbornenes, including 5-ethylidene-2-norbornene. Especially suitable are 1-, 3-, and 4-vinylcyclohexene, norbornene and 5-ethylidene-2-norbornene. Simple linear non-branched α-olefins including, for example, α-olefins containing from 3 to about 20 carbon atoms such as propylene, butene-1,4-methyl-1-pentene, hexene-1 or octene-1 are not examples of strained ring olefins. Preferred statistical arylvinyl polymers are ethylene/styrene, ethylene/propylene/styrene, ethylene/styrene/norbornene, and ethylene/propylene/styrene/norbornene copolymers.

The polymer may also contain residues derived from other comonomers, for example, acrylate monomers. In addition, copolymers derived from diolefins, for example, butadiene and isoprene copolymers may contain residual unsaturation. These are typically hydrogenated, or reduced, prior to being sulfonated. The sulfonated copolymers may be blended with other sulfonated copolymers or with conventional polymers in order to form composite membranes for use in the present invention.

A humidity-conducting polymer for use in a humidity exchange cell of the present invention typically contains at least 20 weight % of residues derived from styrene. More preferably, the copolymer contains from 20 to 50 weight % styrene, and most preferably, about 45 weight % styrene. The range of weight average molecular weight ($M_w$) of the polymer of the invention is from about 20,000 grams/mole to about 1,000,000 grams/mole, and preferably from about 50,000 grams/mole to 900,000 grams/mole. The sulfonated polymer used for the membranes of the present invention are preferably water-insoluble. Water-insoluble is defined as having a solubility of less than 0.5 grams of polymer in 100 grams of water at 100° C. Suitable humidity-conducting polymers include sulfonated, block styrene-ethylene-butylene-styrene copolymers, sulfonated, reduced, statistical styrene-butadiene copolymers and sulfonated statistical styrene-ethylene copolymers. Statistical styrene-butadiene copolymers may be obtained from Goodyear; block styrene-ethylene-butylene-styrene copolymers may be obtained from Shell and statistical ethylene-styrene copolymers (ethylene styrene interpolymers (ESI)) may be obtained from Dow Chemical. The Dow ESI polymers include the pseudo-random interpolymers as described in EP-A-0,416, 815 by James C. Stevens et al. and U.S. Pat. No. 5,703,187 by Francis J. Timmers, both of which are incorporated herein by reference in their entirety.

Where diolefins are used as comonomers, the unsaturated residues in the copolymer membranes of the invention are may selectively hydrogenated prior to sulfonation of aromatic groups derived from the styrene residues. The amount of unsaturation remaining after hydrogenation is less than 5 percent of the starting level of unsaturation, and preferably less than 3 percent of the original. Statistical copolymers of styrene and butadiene, also known as styrene-butadiene rubber, or SBR may be used. The copolymer may be hydrogenated by methods known in the art, such as hydrogen gas in the presence of catalysts such as Raney Nickel, and platinum or palladium metals. The diimide reduction described in the examples may also be employed to produce materials that are useful as ion-conducting membranes. Hydrogenated statistical copolymers of styrene and butadiene are also commercially available. Oxidation of residual unsaturated sites in the polymer at levels greater than 5 percent unsaturation leads to degradation of the polymer and shortens the useful life of the membrane under operating conditions.

The hydrogenation level may be determined by the method of Parker et al. An FTIR spectrum of a hydrogenated styrene butadiene copolymer is analyzed by measuring the heights of the peaks at 963 cm$^{-1}$ and 1493 cm$^{-1}$, corresponding to the absorbance of =CH and —CH$_2$, respectively. The percent hydrogenation is calculated using the following equation:

% hydrogenation=−15.71x+99.4 where x=the ratio of the peak height at 963 cm$^{-1}$ to the peak height at 1493 cm$^{-1}$ A sulfonation process for styrene copolymers is described in U.S. Pat. Nos. 5,468,574, 5,679,482, and 6,110,616. The preferred level of sulfonic acid functionality ranges from about one functional group per five aromatic rings (20 mol %) to about four functional groups per five aromatic rings (80 mol %), such that the equivalent weight of the resulting sulfonated polymer is from about 100 grams/sulfonate equivalent to about 1000 grams/sulfonate equivalent. For example, for a copolymer of 45 weight percent styrene, the preferred range is between one sulfonic acid group per five styrene units (20 mol %, equivalent weight=1200 grams/equivalent) to about four sulfonic acid group per five styrene units (80 mol %, equivalent weight=300 grams/equivalent). Equivalent weight may be further limited to 400-700, and even further limited to 520-690. For a copolymer of 30 weight percent styrene, the preferred range is between one sulfonic acid group per four styrene units (25 mol %, equivalent weight=1400 grams/equivalent) to four sulfonic acid groups per five styrene units (80 mol %, equivalent weight=430 grams/equivalent). The sulfonation level of the polymer may be controlled by the stoichiometric ratio of the sulfonating agent, acetyl sulfate, to the styrene content of the polymer. For example, addition of 1.0 equivalents of acetyl sulfate yields a polymer of 32 mol % sulfonation and 1.4 equivalents yields 44 mol % sulfonation.

The HUX membrane is a hydrocarbon hydrophilic polymer that possesses a low equivalent weight, from 1000 down to 100, preferably 700 down to 300 and most preferably 690 down to 380. Partially sulfonated styrene-olefin copolymers are generally preferred. Specifically, styrene-ethylene and styrene-hydrogenated butadiene, isoprene or equivalent olefinic copolymers that possess a random, alternating, segmented or statistical in monomer distribution along the chain are preferred. Pseudo-random is a subclass of statistical; a weighted change in the monomer incorporation that skews the distribution from a random arrangement (i.e. Bernoullian) is defined as statistical. Linear arrangements have been described here, but branched or grafted including star arrangements of monomers are possible as well. In addition, block copolymers of styrene and hydrogenated butadiene, isoprene, or equivalent olefin can be employed. The block architecture can be diblock, triblock, graft-block, multi-arm starblock, multiblock, segmented or tapered block.

The HUX support material is preferably, but not limited to, a polyolefin, spaced-member, fiber netting. Fiber extrusion followed by melt bonding is a common method to prepare the netting, however, other methods can be used by themselves or in combination. These include injection molding, compression molding, fiber extrusion with solvent bonding, spin bonding, and ultrasonic welding.

Suitable materials for the reinforcing substrate include woven, nonwoven, knit and cross-laid fabrics; in the context of the present invention, the term 'fabrics' is defined as including meshes and nettings. Microporous films may also be used. The fabric of a reinforcing substrate may be composed of synthetic fibers or filaments, glass yarns, non-corroding metal fibers, such as nickel fibers, or carbon fibers. The fibers, filaments or yarns should be ones to which the water-conducting polymer film adheres strongly. Suitable synthetic fibers include polyolefins, particularly polyethylene or polypropylene, and polyesters. The fibers may have organic or inorganic sizing agents or coupling agents applied, including polyvinylalcohol, starches, oil, polyvinylmethylether, acrylic, polyester, vinylsilane, aminosilane, titanate, and zirconate. Silicone-based lubricants are sometimes employed for greater tear strength. A microporous film may be composed of any synthetic polymer to which the humidity-conducting polymer adheres. In particular, the films may have a polyolefin composition, and more particularly, polyethylene. Films having a fluoropolymer composition may also be used. A composite membrane for use in a humidity exchange cell according to the present invention may be prepared by impregnating the substrate with a humidity-conducting polymer. This may be done by any of several known methods. These methods include direct coating, wherein a solution of the humidity-conducting polymer in a suitable solvent, such as a lower alcohol, in particular, methanol or propanol. The benefit of direct coating is that it reduces the number of sub-assemblies and parts and, thus, reduces costs. Low cost fabrication is an object of the invention. Indirect coating methods, such as solution casting, may also be used.

Sequential buildup facilitates the manufacturing of the overall composite; coating is typically continued until a homogenous sheet is formed when reinforcement may or may not be completely coated. Formulations that readily wet the substrate are available at low cost and produce composites without holes or other defects are preferred. Alternatively, the water-conducting polymer may be applied to the reinforcing substrate by hot roll laminating it with reinforcing substrate, thus eliminating the need for multiple coating passes. The water-conducting polymer film may also contain a ceramic filler, if desired. Finally, a composite membrane composed of nonwoven fabric may be manufactured by adding staple-pulped fiber to solution of the water conducting polymer, and coating on a release substrate.

The humidity-conducting polymer may contain one or more additives, including crosslinking agents, flame retardants (suppressants and synergists), biocides (mildewicides, fungicides, anti-mold agents, antiviral agents, bacteriocides, anti-parasitic agents, and insecticides.), plasticizers, uv stabilizers (uv absorbers, and light stabilizers), antioxidants (primary or secondary) and thermal stabilizers. Any one compound may impart one or more characteristic enhancements. The basic requirements are that (a) the additive is miscible with the hydrophilic polymer, (b) it does not compromise the mechanical strength or integrity of the membrane in the cell, (c) it not reduce the performance (e.g. moisture transfer effectiveness) or lifetime of the cell in the application. Therefore, these are objects (a, b, c) of the invention. Although not an object, it is desirable that the additive, retain the activity and efficacy of said characteristic when present with the polymer in the formulation.

For biocides, our principal concern is mold and mildew growth because of the potentially low, local pH of these sulfonated hydrophilic polymers. However, resistance to other possible biological agents such as fungus, bacteria, viruses, parasites, insects or protozoa is desirable. Any biologicals that reduce the available surface area of the membrane for transfer of moisture from the stream must be prevented. Compatible chemical agents are 10,10'-oxybisphenoxarsine available from Rohm and Haas in a liquid or resin carrier under the tradname Vinyzene. An arsenic-free alternative is 4-chloro-3,5-dimethyl phenol an organic chemical available from Aldrich. These can be used effectively at loadings up to 5.0 phr. However, Dow Chemical's fungicide AMICAL 48 and bactericide BIOPAN BP PLUS, both toxic metal-free are preferred.

Flame retardancy is important insofar as additives can reduce the tendency of the cell to catch fire, spread a fire and to reduce smoke emissions. For pure liquid streams the threat of fire does not present itself, except for air/water or some other highly polar gas vapor streams at low humidity. For these applications, a non-halogen flame retardant (basically a flame inhibitor) is typically used for polyolefins. This is available from Unitex chemical under the tradename Uniplex FRX 44-94S. Bromine-containing retardants, Uniplex BAP-755 (brominated alkyl phosphate) and Uniplex FRP-64 (poly (2,6-dibromophenylene oxide)) are also viable. For high performance, the polymeric, flame retardant is desirable but it requires a synergist, for which the high phosphorous-containing FRX 44-94S is suitable. However, Great Lakes Chemicals' tetrabromobisphenol A is preferred for polymer solubility.

Organophosphates serve as hydrophilic plasticizers that function by increasing the water or some other highly polar liquid retention of the membrane in HUX cell in the application environment. The increased water or some other highly polar liquid content may improve performance by increasing membrane permeability as well as reduce flammability, since substantially more water or some other highly polar liquid must evaporate before flames may spread to the cell. In the process, the evaporation of water or some other highly polar liquid suppresses smoke. Also, these can potentially function as synergists for bromine-containing flame retardants. These are trialkyl phosphates, such as trimethyl phosphate, triethyl phosphate, tripropyl phosphate and tris(2-ethyl hexyl) phosphate.

Antioxidants (and thermal stabilizers) can increase shelf life of HUX cells by circumventing the auto-oxidation of the hydrophilic polymer during storage. However, a more important advantage is the ability to reduce oxidation of the sulfonated hydrophilic polymer in the HUX cell during operation since at low humidity the polymer is continuously subject to the transfer of heat and thus, will see temperatures as high as 37° C. Oxidation of organic impurities may result and reduce performance this be minimized with the use of antioxidants. These are basically hindered phenols of high molecular weight and include: stearyl-3-(3',5'-di-tert-butyl-4-hydroxyphenyl) propionate (BNX 1076) and tetrakis [methylene-3 (3',5'-di-tert-butyl-4-hydroxyphenyl) propionate] methane (BNX 1010) both available from Mayo Corp. and poly(phenol-formaldehyde) novalac resin (HRJ-12700) available from Schenectady International. Peroxide decomposers add benefit as synergists to hindered phenols, these are aryl phosphites; such as Tris(2,4-ditert-butylphenyl) phosphite (Benafos 1680). UV stabilizers are important for outdoor applications; these are light absorbers with a broad absorption range of which benzotriazoles are preferred. Ciba's Tinuvin 384-2 (Benzene propionic acid (3-2H-benzotriazol-2-yl)-5-(1,1-di-methylethyl-4)-hydroxy, C7-C9-branched and linear alkyl esters) is suitable because of good thermal and environmental stability. Hindered amine light stabilizers (HALS) may be suitable. However, free amines form salts that may reduce water or some other highly polar liquid transport, these are less preferred. Therefore, nitroso-alkyl and specifically nitroso-alkyl ethers containing HALS are preferred for these polymers to maximize their effectiveness as stabilizers.

Further improvements in mechanical strength and integrity especially at saturation (dehydration or hydration), or when one (separation, dehydration, hydration) or both sides (osmosis, filtration or dialysis) of the membrane are in contact with liquid water or some other highly polar liquid can be obtained through the formation of crosslinks between the polymer chains in the membrane. There are principally two types of crosslinking approaches: (a) crosslinks through carbon-containing groups and (b) crosslinks through sulfur-containing groups.

The first approach (or Type I) is small molecule coupling of two chains through polymeric chain radicals. The polymeric chain radicals are created by reaction of olefinic (or styrenic) units with primary radicals (formed from the thermal decomposition of peroxides, or created by scission and/or ionization of the olefinic units by UV, e-beam, gamma-ray, high energy particles. The polymeric chain radicals form bonds to maleimide by addition to double bonds or by radical coupling. Reaction of two such chains with the single molecule forms a crosslink. N,N'-1,3-Phenylene-dimaleimide is a preferred example. Peroxide initiators are benzoyl peroxide, 1,1-Di-(tert-butylperoxy)-3,3,5-trimethylcyclohexane, and 2,5-dimethyl-2,5-di(t-butylperoxy)hexyne-3.

The high levels of initiator (if below the solubility limit in the polymer) required for the achievement of a dense interconnected network of chains likely leads to primary radical termination of low mobility polymeric chain radicals. Also, cross-linking agents that form stable chain radicals consume initiator without formation of the polymeric chain radicals necessary for the dense network. Co-agent radicals must be of similar reactivity to polymer chain radicals for coupling of adjacent polymer chains. More important, however, is that a substantial concentration of polymeric chain radicals are formed. Initiators are chosen that decompose to highly reactive radicals at moderate temperatures with a very high rate of initiation. The degree of crosslinking necessary to form a 'tight' interconnected network of chains depends on a large variety of factors. The initiator type: functionality, primary radical reactivity, initiation efficiency, coupling or crosslinking agent type; crosslinking mechanism, specific interaction with polymer, microstructure of the polymer; reactivity of polymer radical, mobility and concentration of radicals which is controlled for the most part by temperature and/or where applicable the light intensity for photoinitiation or photosensitization.

Organometallic crosslinking agents of the enolate-type also fare well when used in conjunction with the more reactive alkyl peroxides as initiators. The more stable benzoyl and isobutyrl peroxide radicals tend to have low initiation efficiencies for crosslinking but if high concentrations of initiator can be achieved by increasing solubility in the polymer then these can be suitable. Organometallic agents of chelated metals that possess multiple stable oxidation states are promising, such as metal diketonates or derivatives thereof. Aluminum acetoacetonate is a preferred example. Provided the metals are redox-active in the chelated state, these can potentially catalyze decomposition of peroxides or serve as photoactivators or sensitizers for photoinitiators. Useful peroxide initiators are benzoyl peroxide, 1,1-Di-(tert-butylperoxy)-3,3,5-trimethylcyclohexane, and 2,5-dimethyl-2,5-di(t-butylperoxy)hexyne-3. These can crosslink in conjunction with other agents or alone with heat, ultraviolet, visible light, e-beam, high energy particle bombardment, such, alpha particles, ionizing radiation such as gamma rays and by electric discharge such as plasma.

The list includes but is not limited to: initiators; 1,1-Di-(tert-butylperoxy)-3,3,5-trimethylcyclohexane, 2,5-dimethyl-2,5-di(t-butylperoxy)hexyne-3, tert-butyl peroxide, dicumyl peroxide, methyl ethyl ketone peroxide, meta-chloroperoxybenzoic acid, benzoyl peroxide; crosslinking agents (includes coupling agents); aluminum acetylacetonate, cobalt(III) acetylacetonate, cobalt(II) acetylacetonate, nickel ketene acetals, N,N'-1,3-phenylene-dimaleimide, divinyl sulfone, trispropargyl benzene, divinyl benzene, vinyl triethoxy silane, hexamethyldisilazane, trimethylolpropane trivinyl ether, trimethylolpropane trimethacrylate, trimethyolpropane allyl ether, triallyl cyanurate, and triallyl phosphate.

The second approach (or Type II) is sulfonamide crosslinking. The reaction of sulfonyl-imidazole or equivalent with aromatic amines results in sulfonamide linkage between styrene units. The reaction of a styrene sulfonic acid unit of the polymer chain with 1,1'-carbonyl diimidazole forms styrene sulfonyl imidazole. The imidazole molecule is a good leaving group so even moderate nucleophiles such as, aromatic diamines displace them. A suitable aromatic diamine is 4-aminophenylsulfone.

The principal advantage of both types of crosslinking schemes is that the crosslinking agents may be added to a solution of the polymer, mixed in, and cast normally. Subsequently the HUX cell may be dried in an oven to remove residual solvent, heated in an oven, or exposed to radiation. It is an object of the invention that the additives be simply incorporated into the formulation.

Polymer electrolyte, molecular composite membranes are based on sulfonated hydrocarbon polymers that incorporate lesser amounts of 'rigid rod' polymers to provide added strength and rigidity in the hydrated state. The basic approach is to prepare insitu telechelic polymers (telomers) of the molecular reinforcement and couple these to the sulfonated hydrocarbon polymer using one of the aforementioned crosslinking chemistries. In this way a molecular composite network is formed at appreciable lower cost than the specialty polymers but with many of the benefits. In addition the telechelic approach could be used to prepare linear copolymers of hydrocarbon polymer electrolytes and rigid-rod aromatic polymers that are melt or solution processible. Given the coupling (or crosslinking) chemistries available aromatic polyimides, polyamides, poly(amide-imides), poly(ether-imides), polyurethanes, poly(ether-urethanes), polyureas, poly(urea-urethanes), polyesters, polysulfones, poly(ether-sulfones), poly(sulfonamides), poly(ether ketones), polyquinoxalines, polybenzimidazoles, polybenzothioazoles, polypyrrones etc. can be prepared as molecular composites with sulfonated hydrocarbon polymers. Low molecular weight prepolymers of these materials can prepared or found that will be compatible with a telechelic route. In addition, amine, alcohol, acid and anhydride functionalized or terminated, hydrocarbon thermoplastics or high temperature aromatic polymers may also be incorporated and serve a similar function if compatible solvents can be found. But in most cases, solution blending of these materials is difficult since there is a tendency towards phase separation, so polymers chosen should be miscible in the solution state. Melt blending of the polymers in a twin-screw extruder or motionless mixer is the method of choice. This requires that both materials have thermal stability limits that facilitate compounding.

A list of molecular building blocks (in addition to above) includes, but is not limited to: 4-aminophenol, pyromellitic dianhydride, oxydianiline, 4,4'-carbonyldiphthalic anhydride, maleic anhydride, bisphenol acetone, 3-(di) chlorophenyl sulfone, trimethylolpropane, 4,4-oxybis (phenyl isocyanate), ethylene glycol, terephthalic acid and 3,3'-diaminobenzidine.

Micro-reinforced composites can benefit from crosslinking chemistries described as well. These are microporous supports those that have pore sizes less than a few microns and exceptionally large open volumes greater than 70%, and a thickness of less than a mil, fabricated from mostly polyolefins; polyethylene (high density or ultra high molecular weight) and propylene, but polytetrafluoroethylene is very common, polyester and polyamide to a lesser extent. In the process, the polymer is impregnated into the support but any number of processes; solution casting, melt impregnation, using a knife blade, knife-over-roll, reverse-roll and others. The polymer electrolyte is crosslinked within the support and depending on the chemistry may be grafted to the support to some extent. The micro-reinforced polymer electrolyte composite membrane is substantially stronger and if impregnated properly has vastly reduced water uptake and thus, improved dimensional stability than the crosslinked PEM alone. The one challenge is that if sufficient grafting of the PEM to the reinforcement is not achieved these materials can exhibit interfacial failure when hydration cycled in the application. So proper choice of initiator and coupling agent is necessary for maximum benefit. Pretreatment of the reinforcement beforehand to introduce functional groups on the surfaces is important for maximum adhesive strength.

Organic-inorganic hybrid composites will also work. This relatively new approach makes use of inorganic materials; ceramics, glasses, heteropolyacids, minerals, graphite, buckyballs, buckytubes or clays etc. as reinforcement. These can potentially increase the mechanical integrity of the membrane. These are prepared by either physically mixing the high surface area particles (may be foams) or chemically by insitu formation either during or after forming the membrane. The chemical routes to many of the ceramics, glasses and minerals are using a sol-gel process (silanes, carbosilanes, borosilanes, boronitrides, siloxanes, or silazanes, sulfur nitrides, phosphazenes, aluminas, aluminoxanes, etc.) or other modified chemical route. In these cases, chemical networks of the inorganic materials are prepared within the structure of the polymer. A co-continuous network can be formed in which the base polymer is incorporated into the inorganic phase, hence the term hybrid. The base polymer electrolyte membrane can be covalently bonded to the inorganic network to improve adhesion through suitable selection of chemistry (e.g. coupling agents). The composites must possess sufficient erosion resistance to work for extended periods in applications intended. In this case, high temperature operation (>140C) is preferred for stability. It is thought that these composites retain water and impart enhanced transport characteristics to polymers at elevated temperature. And for many of the applications mentioned above high pressures are to be employed to prevent phase change in fluids.

Another approach to improving mechanical properties of membranes is to incorporate inorganic materials in the polymer film, resulting in a type of polymer composite referred to herein as an organic-inorganic hybrid. In these hybrid materials, the organic (polymer) and inorganic components are combined at the molecular level; the hybrids may be derived from a reaction between the polymer and the inorganic alkoxide, resulting in a polymer matrix nanocomposite. The presence of a finely dispersed inorganic oxide gel/polymer network provides good mechanical strength, extraordinary thermal stability, dimensional stability, good transport properties, ionic conductivity and/or permeability and permselectivity.

The polymer in the organic-inorganic hybrid is preferably derived from a hydrocarbon polymer that possesses a low equivalent weight, from 1000 down to 100, preferably 700 down to 400 and most preferably 690 down to 520. Partially sulfonated styrene-olefin copolymers are generally preferred. Specifically, styrene-ethylene and styrene-hydrogenated butadiene, isoprene or equivalent olefinic copolymers and terpolymers that possess a random, alternating, segmented or statistical in monomer distribution along the chain are preferred. Pseudo-random is a subclass of statistical; a weighted change in the monomer incorporation that skews the distribution from a random arrangement (i.e. bernoullian) is defined as statistical. Linear arrangements have been described here, but branched or grafted including star arrangements of monomers are possible as well. In addition, block copolymers of styrene and hydrogenated butadiene, isoprene, or equivalent olefin can be employed. The block architecture can be diblock, triblock, graft-block, multi-arm starblock, multiblock, segmented or tapered block.

In particular, the hybrid may incorporate an inorganic alkoxide having the formula:

$$R^1_m M R^2_n R^3_p R^4_{(4-m-n-p)}$$

wherein M is Si, Ti, Zr, or mixtures thereof;

$R^1$, $R^2$, $R^3$ and $R^4$ are independently alkyl, substituted alkyl, alkenyl, acyloxy, alkoxy, halo, amino, mercapto, or epoxy; m, n and p are independently 0, 1, 2, 3 or 4; and at least one of $R^1$, $R^2$, $R^3$ and $R^4$ is alkoxy.

In some embodiments, M may be limited to Si or Zr; Si and Zr are particularly useful. Examples of specific inorganic alkoxides include tetraethylorthosilicate, vinyltriethoxysilane, and zirconium bis(diethyl citrato) dipropoxide.

Inorganic alkoxides include tetralkoxysilanes [Si(OR)$_4$], tetraalkyl titanates [Ti(OR)$_4$] and tetraalkyl zirconates [Zr(OR)$_4$], where R is alkyl, particularly, methyl, ethyl, propyl, isopropyl, n-butyl, or t-butyl, and organosilanes [R$_n$SiX$_{(4-n)}$], organic titanates [R$_n$TiX$_{(4-n)}$], organic zirconates [R$_n$ZrX$_{(4-n)}$]. The most common alkoxy groups are methoxy, and ethoxy. Other inorganic alkoxides that may be useful in improving properties of sulfonated polymers used as heat, ion and moisture tranfer membranes are based on aluminum, tin and boron.

In the context of the present invention, alkyl is intended to include linear, branched, or cyclic hydrocarbon structures and combinations thereof. Lower alkyl refers to alkyl groups of from 1 to 4 carbon atoms. Lower alkyl groups include methyl, ethyl, n-propyl, isopropyl, and n-, s- and t-butyl. Preferred alkyl groups are those of $C_{20}$ or below. Cycloalkyl is a subset of alkyl and includes cyclic hydrocarbon groups of from 3 to 8 carbon atoms. Examples of cycloalkyl groups include cyclopropyl, cyclobutyl, cyclopentyl, and norbornyl Alkoxy or alkoxyl refers to groups of from 1 to 8 carbon atoms of a straight, branched, cyclic configuration and combinations thereof attached to the parent structure through an oxygen. Examples include methoxy, ethoxy, propoxy, isopropoxy, cyclopropyloxy, and cyclohexyloxy. Lower alkoxy refers to groups containing one to four carbons.

Acyl refers to groups of from 1 to 8 carbon atoms of a straight, branched, cyclic configuration, saturated, unsaturated and aromatic and combinations thereof, attached to the parent structure through a carbonyl functionality. One or more carbons in the acyl residue may be replaced by nitrogen, oxygen or sulfur as long as the point of attachment to the parent remains at the carbonyl. Examples include acetyl, benzoyl, propionyl, isobutyryl, t-butoxycarbonyl, and benzyloxycarbonyl. Lower-acyl refers to groups containing one to four carbons.

Aryl and heteroaryl mean a 5- or 6-membered aromatic or heteroaromatic ring containing 0-3 heteroatoms selected from nitrogen, oxygen or sulfur; a bicyclic 9- or 10-membered aromatic or heteroaromatic ring system containing 0-3 heteroatoms selected from Nitrogen, oxygen or sulfur; or a tricyclic 13- or 14-membered aromatic or heteroaromatic ring system containing 0-3 heteroatoms selected from Nitrogen, oxygen or sulfur. Each of these rings is optionally substituted with 1-3 lower alkyl, substituted alkyl, substituted alkynyl, carbonyl, nitro, halogen, haloalkyl, hydroxy, alkoxy, OCH(COOH)$_2$, cyano, primary amino, secondary amino, acylamino, phenyl, benzyl, phenoxy, benzyloxy, heteroaryl, or heteroaryloxy; each of said phenyl, benzyl, phenoxy, benzyloxy, heteroaryl, and heteroaryloxy is optionally substituted with 1-3 substitutents selected from lower alkyl, alkenyl, alkynyl, halogen, hydroxy, haloalkyl, alkoxy, cyano, phenyl, benzyl, benzyloxy, carboxamido, heteroaryl, heteroaryloxy, nitro or —NRR (wherein R is independently H, lower alkyl or cycloalkyl, and —RR may be fused to form a cyclic ring with nitrogen). The aromatic 6- to 14-membered carbocyclic rings include, for example, benzene, naphthalene, indane, tetralin, and fluorene; and the 5- to 10-membered aromatic heterocyclic rings include, e.g., imidazole, pyridine, indole, thiophene, benzopyranone, thiazole, furan, benzimidazole, quinoline, isoquinoline, quinoxaline, pyrimidine, pyrazine, tetrazole and pyrazole.

Alkylaryl means an alkyl residue attached to an aryl ring. Examples are benzyl and phenethyl. Heteroarylalkyl means an alkyl residue attached to a heteroaryl ring. Examples include pyridinylmethyl and pyrimidinylethyl.

Heterocycle means a cycloalkyl or aryl residue in which one to two of the carbons is replaced by a heteroatom such as oxygen, nitrogen or sulfur. Examples of heterocycles that fall within the scope of the invention include pyrrolidine, pyrazole, pyrrole, indole, quinoline, isoquinoline, tetrahydroisoquinoline, benzofuran, benzodioxan, benzodioxole (commonly referred to as methylenedioxyphenyl, when occurring as a substituent), tetrazole, morpholine, thiazole, pyridine, pyridazine, pyrimidine, thiophene, furan, oxazole, oxazoline, isoxazole, dioxane, and tetrahydrofuran.

Substituted alkyl, aryl, cycloalkyl, or heterocyclyl refer to alkyl, aryl, cycloalkyl, or heterocyclyl wherein up to three H atoms in each residue are replaced with halogen, haloalkyl, hydroxy, lower alkoxy, carboxy, carboxalkoxy, carboxamido, cyano, carbonyl, nitro, primary amino, secondary amino, alkylthio, sulfoxide, sulfone, acylamino, acyloxy, amidino, phenyl, benzyl, heteroaryl, phenoxy, benzyloxy, heteroaryloxy, or substituted phenyl, benzyl, heteroaryl, phenoxy, benzyloxy, or heteroaryloxy.

Haloalkyl refers to an alkyl residue, wherein one or more H atoms are replaced by halogen atoms; the term haloalkyl includes perhaloalkyl. Examples of haloalkyl groups that fall within the scope of the invention include $CH_2F$, $CHF_2$, and $CF_3$.

The organic-inorganic hybrid materials may be prepared by using a sol-gel type process, which is an acid or base-catalyzed hydrolysis-condensation reaction of inorganic alkoxides. Where only the inorganic alkoxide is present, the reaction typically is run in a solvent containing water, and proper drying of the swollen gel produces an inorganic oxide glass. For example, where the inorganic alkoxide is an alkoxy silane, polysilicates typically grow in molecular weight and chain length within the polymer until most or all of the alkoxy groups are removed and a nonlinear network of Si—O—Si remains. Stable condensation products are also form with other oxides such as those of aluminum, zirconium, tin, and nickel. Where at least one of $R^1$, $R^2$, $R^3$ and $R^4$ is a nonhydrolyzable organic functional group, typically vinyl, amino, chloro, epoxy, mercapto, the functional group may attach to the polymer while the alkoxy group(s) may attach to silicon. As the hydrolysis reaction progresses, the inorganic alkoxides may condensation to form oligomers, and then polysilcates.

A sol-gel process using an alkoxy silane and incorporating a host polymer has been described in the literature. A polymer such as Nafion® perflorinated ionomer was swollen with solvent and then immersed in a solution of solvent, water, acid and alkoxidesilicate such tetraethylorthosilicate (TEOS) or vinyltriethoxysilane (VTES). TEOS or VTES and its hydrolyzed species diffused into the hose polymer and reacted to form silicate particles while the solvent was removed under heat/vacuum.

An improved process is to prepare the hybrids by forming the nanocomposite in a single major step as the polymer forms a film, and the co-dissolved in organic alkoxide, such as TEOS or VTES undergoes a sol-gel reaction, simultaneously forming a solution. This method is inherently simpler than the previous since polymer film does not have to be preformed before an in situ sol-gel reaction. Moreover, this method gives better control over how much silicate is incorporated into the polymer matrix. The previous method relied upon how much TEOS precursor could diffuse into the matrix in a given time, whereas silicate uptake is now controlled by how much precursor is charged into the polymer solution.

The micro- and macrostructure of the polymer matrix can be controlled through the optimization of several parameters, for example, coupling agents (different Si, Ti, Al, Zr, and B), pH, concentration, temperature, and solvent.

In addition, there are many possibilities incorporating organic materials into sol-gel matrices, including, for example, binding organic functional groups covalently to inorganic network formers such as organoalkoxysilanes, organoalkoxytitanate, and organoalkoxyzirconate as sol-gel precursors. Since many different functional groupings may be linked to the silane, or titanate, and/or zirconate, a large variety of material can be prepared with this approach. Other approaches are to link organic groupings to other types of alkoxide, e.g. by complex formation or by ionic bonds. In addition to this, reactive organic groupings such as vinyl, amino, and others can be used to be cross-linked the host polymer.

Figure 2:
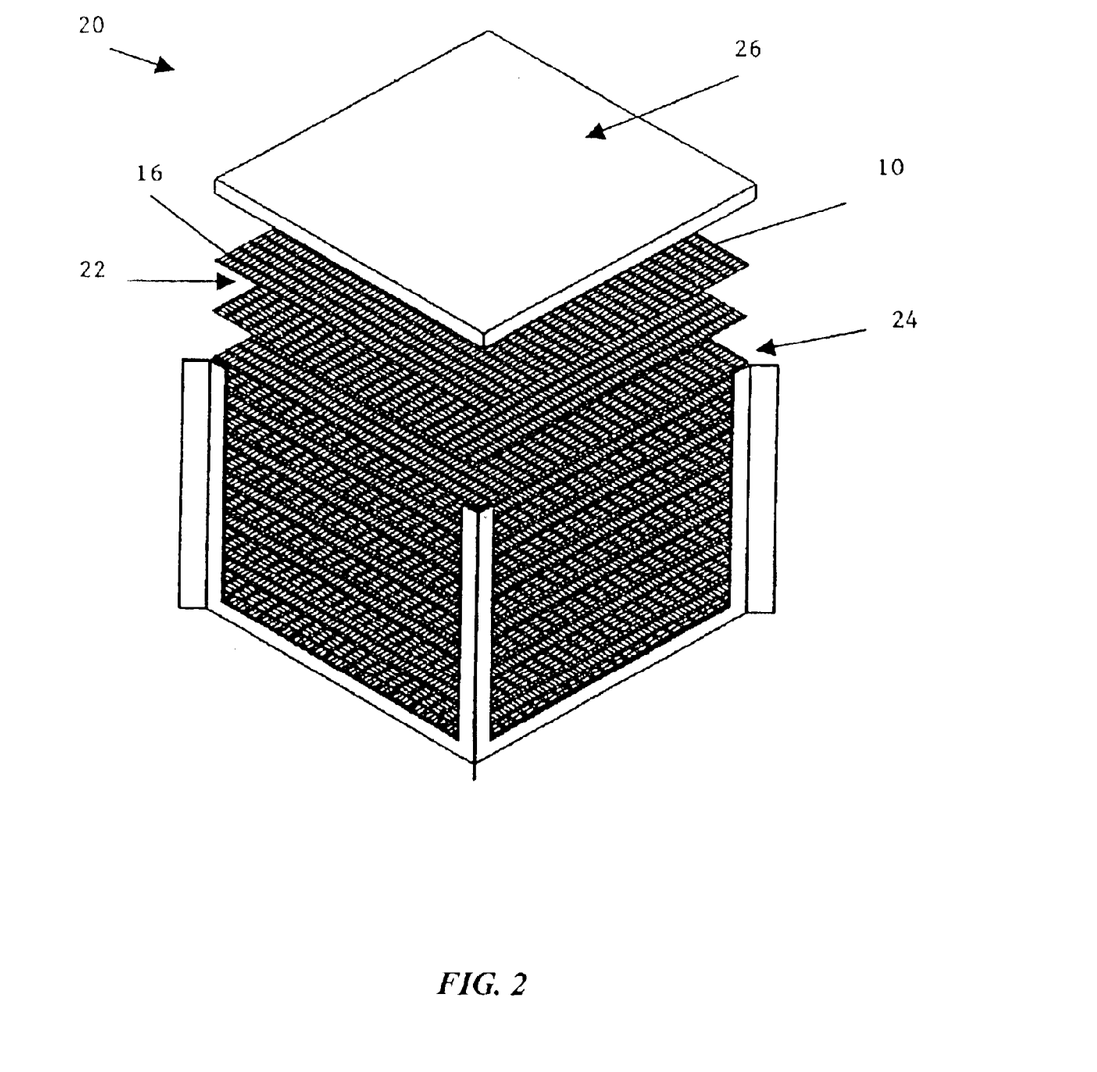
FIG. 2 is a partially exploded view of a humidity exchange cell according to the present invention.

FIG. 2 is a partially exploded view of a humidity exchange cell or ventilator core 20 including a composite membrane 10, a first chamber 22 for containing a first fluid, a second chamber 24 for containing a second fluid and a number of spacers or ribs 16 which are adhered to membrane 10. Cell 20 includes a series of alternating first and second chambers. A cap 26 may be used to enclose the topmost and/or bottommost chambers.

The membranes 10 are stacked one on top of another to form ventilator core 20 as shown in FIG. 2. The orientation of the each layer is rotated by 90 degrees as it is put down into the core. This forms the cross-flow pattern for the exchange of heat, ions and/or moisture within the core. Not shown, but fully realizable, is a counter-flow arrangement of the layers. Here the layers would be in a single orientation, with no rotation, in the core. A complex manifold would be designed to route gas streams to every other layer in the stack. These manifolds would be placed on opposite sides of the core. The non-manifolded sides of the core could be sealed to the external environment if necessary.

Spacer 16, as shown in FIGS. 1 and 2, is configured as a series of ribs, typically adhered to the humidity-conducting polymer surface. These ribs may have a synthetic polymer composition, particularly, PVC, and may be rectangular or circular in cross-section. In other embodiments (not shown), spacer 16 may be a corrugated paper or plastic sheet. In some embodiments, spacer 16 may be a series of adhesive beads. The adhesive may be a hot-melt, cold-melt, or solid adhesive; it may be either thermoplastic or thermosetting. The HUX cell may possess certain specific sub-elements to be effective as a mass (i.e. moisture) exchanger. The basic sub-elements are as follows: (a) a hydrocarbon hydrophilic polymer membrane formulated to be highly permeable to water or some other highly polar liquid or gas, (b) a support matrix to impart mechanical integrity to the membrane and to maintain planarity during operation and (c) a manifold for the distribution of a fluid across the face of the membrane. The disclosed HUX cell is of unitary design in that it incorporates all three sub-elements into a complete cell structure that can be fabricated as a single unit. The device can be built up of this structure by simple stacking and securing the cells in an enclosure.

EXAMPLES

Example 1

Figure 3:
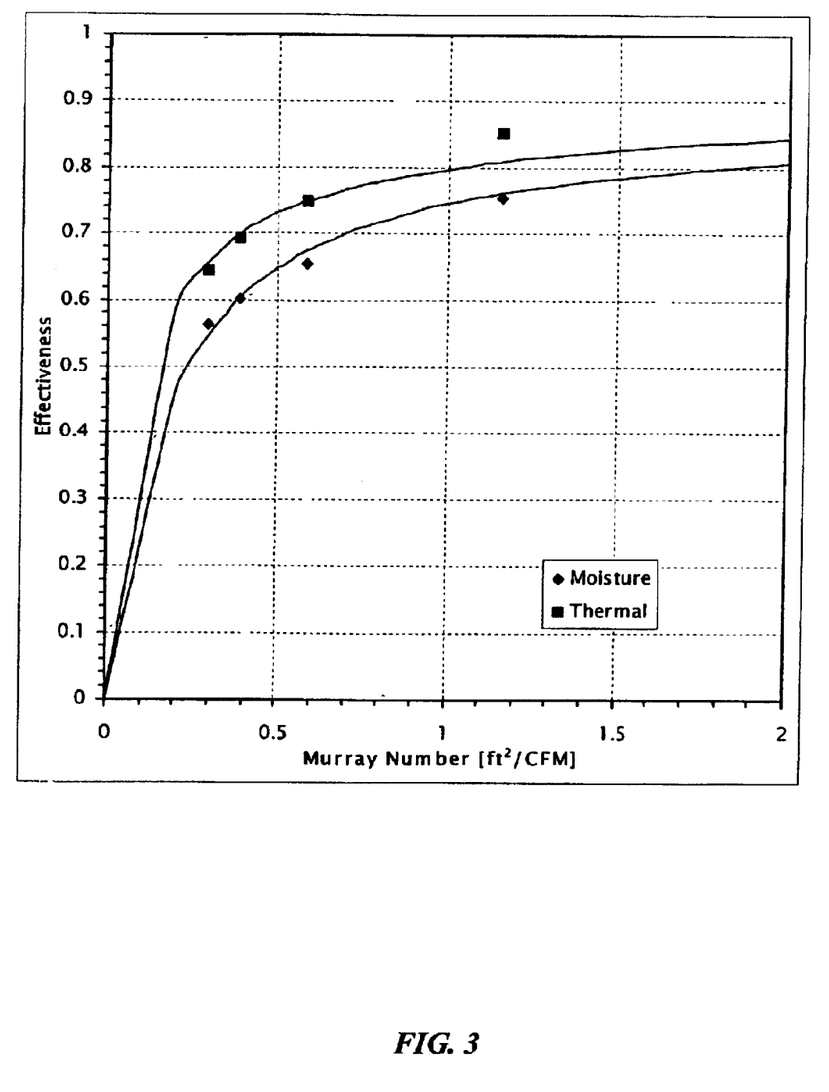
FIG. 3 is a graph showing high heat and water transfer using a humidity exchange cell according to the present invention.

A cross-flow sensible and latent heat exchanger was constructed. The membranes in the exchanger were made by laminating a nylon non-woven reinforcement to a layer of a sulfonated styrene-olefin polymer. The membranes were stacked on top of one another using a PVC spacer with an applied adhesive. The PVC spacers were oriented at 90 degrees to each other on alternating layers. Every other layer in the core had the same flow direction: 1, 3, 5, 7 etc. had the same flow direction while 2, 4, 6, 8, etc. had a flow direction that was oriented 90 degrees. The edges of each layer in the core were sealed with double-sided adhesive tape. The cross-flow exchanger was placed in a test apparatus where the flow rate, temperature, and moisture of two airflows could be controlled. One air flow had approximately a 90° F. temperature at a relative humidity of 55% of saturation. The other airflow was held at 70° F. and a relative humidity of 50% of saturation. The exchange of sensible and latent heat between the two airflows at different airflow rates was monitored. The data in graph form is shown in FIG. 3. The airflow is expressed is normalized as a function of the square feet of membrane area. This allows us to compare exchangers of various materials and exchangers against each other using the exchange area within the exchanger. The graph shows that over 70% total effectiveness for this type of exchanger can be achieved using sulfonated styrene-olefin polymer membranes.

Example 2

Organic-Inorganic Hybrids as Heat and Moisture Exchange Membranes
Materials

1) The two base partially sulfonated styrene-olefin copolymers A and B were synthesized by our lab were used in the examples. Polymer A is a sulfonated Ehtylene/Stryene Statistical copolymer. Polymer B is a sulfonated Stryene/Ethylene/propylene taped copolymer. Both polymer A and B were prepared and characterized using procedures analogous to those contained within U.S. Pat. No. 6,413,298. The styrene content of the polymer A was 76 wt-% and the sulfonation content of this polymer was 34 mol-% with respect to moles of styrene present. The styrene content of the polymer B was 57 wt-% and the sulfonation content of this polymer was 35 mol-% with respect to moles of styrene present. Both the solutions of polymeric resin A and B were prepared by dissolved the solid polymer respectively in n-propanol over a period of time with good mixing until homogeneous solution obtained.

2) All the coupling agents were obtained form Aldrich chemical co. or Dow-Corning For the following examples, the membranes were cast on a silicone-coated polyester release film (Douglas-Hanson) held down by vacuum suction on metal platens. A doctor blade (006 bar) except notes specially was used to drawing the casting solution across the film. The membranes then were dried of solvent in a lab fume hood. The membranes thickness in all cases was approximately 1 mil. For heat treatment, the membrane with release film was placed on top of a glass in a gravity convection oven at specified temperatures vs times.

The hybrid membranes prepared in the following examples were evaluated on gel retention test, water uptake, moisture transfer test, ionic conductivity, growth rate test and a hydrogen peroxide decomposition test. The base properties for the polymer A and B ere the following: gel retention: 0% for both A and B; water uptake: 200% (A) and 180% (B); moisture transfer: 0.265/10 min (A) and 0.255/10 min (B); ionic conductivity: ~0.1 S/cm for both A and B; growth rate in DI water (approximately): X:Y:Z=60%:60%: ~20% for both A and B; hydrogen peroxide decomposition test: less than 1 hour and 15 min (in aqueous hydrogen peroxide at concentrations of 0.001 mol/l and 0.1 mol/l, respectively) for both A and B. The respective properties for all hybrid membranes prepared in the following examples were significantly improved on gel retention, water uptake, dimensional stability and degradation of hydrocarbons in a range of 50 to 80% based on the base polymers. The other properties such as moisture transfer and ionic conductivity were kept at the similar level as the base polymers.

EXAMPLE 2.1

General Procedure

Add tetraalkoxysilane such as tetraethyl orthosilicate (TEOS) or organosilane such as vinyltriethoxysilane (VTES), etc. into the polymer A or B solution with vigorously stirring at 40° C. for 30 min until the polymer solution became homogeneous. Neat membranes (~1 mil) were cast from the solution form a gel in n-propanol after 20 min or so at room temperature. The membrane was further heat treatment at different temperature vs times. The initial composition and the experimental condition used are summarised in Table 1. The membranes were evaluated on gel retention, water uptake, and moisture transfer test and the result were reported in Table 2.

TABLE 1

Initial composition of the studied mixture in polymer/silane system and experimental condition used

| Sample No | Sulf. Polymer (wt-%, g)) | TEOS (g) | VTES (g) | VTMS (g) | Heat T(C.) and time |
|---|---|---|---|---|---|
| 1 | A(13.0%, 50 g) | 2.1 | | | 110 C., 24 h |
| 2 | A(13.0%, 50 g) | 1.6 | | | 110 C., 16 h |
| 3 | A(13.0%, 50 g) | 1.0 | | | 120 C., 5 h |
| 4 | A(13.0%, 50 g) | 1.6 | | | 80 C./ 30 mmHg, 5 h |
| 5 | A(13.0%, 50 g) | 1.6 | | | 160 C., 3 h |
| 4 | A(13.2%, 50 g) | | 2 | | 120 C., 3 h |
| 5 | A(13.2%, 30 g) | | 1.2 | | 120 C., 1 h |
| 6 | A(13.2%, 50 g) | 0.8 | 0.8 | | 120 C., 1 h |
| 7 | A[a](12%, 50 g) | | 1.2 | | 120 C., 1 h |
| 8 | A[b](14.2%, 50 g) | 0.8 | 0.8 | | 140 C., 30 min |
| 9 | A(13.2%, 30 g) | | 1.2 | | 135 C., 25 min |
| 10 | A(13.2%, 30 g) | | | 0.3 | 135 C., 25 min |
| 11 | A(13.2%, 30 g) | | | 0.6 | 135 C., 25 min |
| 12 | A(13.2%, 30 g) | | | 0.9 | 135 C., 25 min |
| 13 | A(13.2%, 30 g) | | | 1.2 | 135 C., 25 min |
| 14 | A(13.2%, 30 g) | | | 1.5 | 135 C., 25 min |
| 15 | A(13.2%, 30 g) | | | 2.0 | 135 C., 25 min |
| 16 | A[b](16.1%, 100 g) | | | 3.4 | 130 C., 15 min |
| 17 | A(13.2%, 50 g) | | | 1.5 | 140 C., 10 min |
| 18 | A[c](14.38%, 100 g) | | | 2.3 | 135 C., 15 min |
| 19 | B(11.8%, 160 g) | | 7.0 | | 135 C., 15 min |
| 20 | B(8.8%, 50 g) | | | 1.1 | 135 C., 15 min |

Notes:
[a]The polymer A solution containing antioxidants (2000 ppm) and a fungcide (1000 ppm).
[b]The polymer A solution containing antioxidants (2000 ppm) and fungcide (1000 ppm) and a flame retardant (33 phr). (phr = parts per hundred resin based on solid polymer).
[c]The sulfonation content of this polymer was 38 mol-% with respect to moles of styrene present.

TABLE 2

| Sample No. | Gel retention (%) | Water uptake (%) | Moisture transfer (g/10 min) |
|---|---|---|---|
| 1 | 100.00 | 57.62 | 0.230 |
| 2 | 95.02 | 60.42 | 0.247 |
| 3 | 91.00 | 80.91 | 0.250 |
| 4 | 83.63 | 28.34 | 0.274 |
| 5 | 87.86 | 44.07 | 0.253 |
| 6 | 90.96 | 60.00 | 0.225 |
| 7 | 84.20 | 51.49 | 0.258 |
| 8 | 76.00 | 27.97 | 0.250 |
| 9 | 83.58 | 38.90 | 0.249 |
| 10 | 82.35 | 49.50 | 0.245 |
| 11 | 82.45 | 49.06 | 0.260 |
| 12 | 88.20 | 34.56 | 0.266 |
| 13 | 82.35 | 32.69 | 0.256 |
| 14 | 90.44 | 28.83 | 0.273 |
| 15 | 91.37 | 17.43 | 0.245 |
| 16 | 80.57 | 33.01 | 0.264 |
| 17* | 92.14 | 37.61 | 0.267 |
| 18 | 91.00 | 80.91 | 0.250 |
| 19 | 92.24 | 69.77 | 0.233 |
| 20 | 87.73 | 46.74 | 0.246 |

*The growth rate of this sample was X: Y: Z = 10%: 20%: 0.005% approximately.

Example 2.2

A ultrahigh molecular weight polyethylene (UHMW PE) microporous support material obtained from DSM solutech has a nomial thicknese of 0.8 mil (0.02 mm), was mounted on the vacuum suction metal platens. The polymer A solution which the same composition of the sample #12 in Example 2.1 was use to coat over the above microporous support material by a doctor blade (005 bar). The resulting composite membrane was dried of the solvent at room temperature and then further heat treatment at a gravity convection oven at 130 C for 10 min. The gel retention of the membrane was 93.28% and the moisture transfer was 0.263 g/10 min.

Example 2.3

The cast solution and the support material used in this example were the same as in example 2. A doctor blade (003 bar) was used to draw the cast solution across the liquid film. After casting a sheet of UHMW PE microporous support material was immediately laid on the top of the above liquid film and put a cover on the film to slowly dried film at room temperature for 15 min and then removed the cover and continue to dry the film for additional 10 min. After the supported film was dried the same polymer solution was cast over on the dried film. The obtained dried film was heat treated at same condition as Example 2.2 to give a transparent membrane with thickness ~2 mils. The gel retention of the membrane was 92.09%, the moisture transfer was 0.230 g/10 min, and ionic conductivity: ~0.07 S/cm. The growth rate of the membrane was X:Y:Z=0%:2%:0.005%, approximately.

The membrane was evaluated by a hydrogen peroxide decomposition test. In the test, the membranes were immersed in two aqueous hydrogen peroxide solutions at concentrations of $1 \times 10^{-3}$ mol/l and 0.1 mol/l at 80° C. and the change of weight was measured. Evaluation was conducted for 7 hours. The weight retentions of the membrane after tests were 90.32% and 85.23% in the solutions of hydrogen peroxide ($1 \times 10^{-3}$ mol/l) and 0.1 mol/l, respectively.

Example 2.4

Following the procedure of Example 2.3, only the cast solution was different. Here the cast solution was a mixture of the polymer solution B (100 g, 7.6 wt-%) and vinyltrimethoxy-silane (VTMS, 2.5 g). The gel retention of the membrane was 87.10%, the moisture transfer was 0.223 g/10 min, and ionic conductivity: ~0.07 S/cm. The growth rate of the membrane was X:Y:Z=0%:3%:0.003%, approximately.

The weight retentions of the membrane after hydrogen peroxide decomposition tests were 93.24% and 77.46% in the solutions of hydrogen peroxide ($1 \times 10^{-3}$ mol/l) and 0.1 mol/l, respectively.

Example 2.5

Add Zirconium (IV) bis (dietyl citrato) diproxide (0.5 g) into the polymer A solution (50 g) which the same as in example 2 with vigorously stirring at 40° C. for 20 min until a viscous polymer solution became homogeneous. Then cast a neat membrane (~1 mil) with this solution and dried at room temperature. And then the membrane was treated at a gravity convection oven at 130 C for 15 min. The gel retention of the membrane was 84.20%.

Example 2.6

Add Zirconium (IV) bis (dietyl citrato) diproxide (0.5 g) into the polymer A solution (12.0 wt-%, 30 g) with vigorously stirring at 40° C. for 30 min until a viscous polymer solution became homogeneous. Then cast a neat membrane (~1 mil) with this solution and dried at room temperature. And then the membrane treated at a gravity convection oven at 135 C for 15 min. The gel retention of the membrane was 76.10%.

What is claimed is:

1. An organic-inorganic hybrid derived from combining at least one inorganic alkoxide and at least one sulfonated styrene polymer comprising sulfonated styrene and olefin units.

2. An organic-inorganic hybrid according to claim 1, derived from a reaction between said at least one inorganic alkoicide and said at least one sulfonated styrene polymer.

3. An organic-inorganic hybrid according to claim 1, wherein said inorganic alkoxide has the formula:

$$R^1{}_m MR^2{}_n R^3{}_p R^{-1}{}_{(41-m-n-p)}$$

wherein M is Si, Ti, Zr, or mixtures thereof;

R$^1$, R$^2$, R$^3$ and R$^4$ are independently alkyl, substituted alkyl, alkenyl, aryl, acyloxy, alkoxy, halo, amino, mercapto, or epoxy;

m, n and p are independently 0, 1, 2, 3 or 4; and at least one of R$^1$, R$^2$, R$^3$ and R$^4$ is alkoxy.

4. An organic-inorganic hybrid according to claim 3, wherein M is Si or Zr.

5. An organic-inorganic hybrid according to claim 3, wherein M is Si.

6. An organic-inorganic hybrid according to claim 3, wherein

R$^1$ is alkyl, substituted alkyl, alkenyl, acyloxy, halo, amino, mercapto, or epoxy;

R$^2$ is alkyl, substituted alkyl, alkenyl, acyloxy, alkoxy, halo, amino, mercapto, or epoxy;

R$^3$ and R$^4$ are alkoxy; and m is 1.

7. An organic-inorganic hybrid according to claim 3, wherein

R$^1$ is alkyl, substituted alkyl, alkenyl, acyloxy, halo, amino, mercapto, or epoxy;

R$^2$, R$^3$ and R$^4$ are alkoxy; and m is 1.

8. An organic-inorganic hybrid according to claim 1, wherein said inorganic alkoxide is vinyltriethoxysilane or vinyltrimethoxysilane.

9. An organic-inorganic hybrid according to claim 1, wherein said sulfonated styrene polymer comprises from about 20 weight percent to about 80 weight percent styrene.

10. An organic-inorganic hybrid according to claim 1, comprising from about 25 mole percent to about 80 mole percent styrene sulfonate.

11. An organic-inorganic hybrid according to claim 1, wherein said olefin units are derived from selected from the group consisting of ethylene, propylene, 1-butane, 2-bulone, 1-pentene, 4-methyl-1-pentene, 1-hexene, 1-oclene, isobutylene, butadiene and isoprene.

12. An organic-inorganic hybrid according to claim 11, wherein said olefin units are derived from butadiene.

13. An organic-inorganic hybrid according to claim 12, wherein the sulfonated styrene polymer is hydrogenated.

14. An organic-inorganic hybrid according to claim 1, wherein said sulfonated styrene polymer is selected from the group consisting of sulfonated statistical styrene copolymers, sulfonated styrene block copolymers, sulfonated styrene tapered block copolymers and sulfonated styrene graft copolymers.

15. An organic-inorganic hybrid according to claim 1, wherein said sulfonated styrene polymer is a sulfonated styrene-butadiene tapered block copolymer.

16. A membrane for transferring at least one of heat, ions, and moisture, polar liquids and polar gases, said membrane comprising the organic-inorganic hybrid of claim 1.

* * * * *

UNITED STATES PATENT AND TRADEMARK OFFICE
CERTIFICATE OF CORRECTION

PATENT NO. : 6,841,601 B2
DATED : January 11, 2005
INVENTOR(S) : Serpico et al.

It is certified that error appears in the above-identified patent and that said Letters Patent is hereby corrected as shown below:

Title page,
Item [75], Inventors, delete "Gary Wnek, Midlotman, FL (US)" and insert
-- Gary Wnek, Midlothian, VA (US) --

Column 20,
Lines 11-12, delete present structure "$R^1_m MR^2_n R^3_p R^1_{(41-m-n-p)}$" and replace with
-- $R^1_m MR^2_n R^3_p R^4_{(4-m-n-p)}$ --
Line 18, delete "or4" and insert -- or 4 --
Line 35, delete "$R^4$are" and insert -- $R^4$ are --
Lines 46 thru 50, delete "An organic-inorganic hybrid according to claim 1, wherein said olefin units are derived from selected from the group consisting of ethylene, propylene, 1-butane, 2-bulone, 1-pentene, 4-methyl-l-pentene, 1-hexene, 1-oclene, isobutylene, butadiene and isoprene."
and insert -- An organic-inorganic hybrid according to claim 1, wherein said olefin units are derived from comonomers selected from the group consisting of ethylene, propylene, 1-butene, 2-butene, 1- pentene, 4-methyl-1-pentene, 1-hexene, 1-octene, isobutylene, butadiene and isoprene units. --
Line 52, insert the word -- units -- after the word "butadiene" at the end of the sentence Signed and Sealed this Seventeenth Day of May, 2005

JON W. DUDAS
*Director of the United States Patent and Trademark Office*

UNITED STATES PATENT AND TRADEMARK OFFICE
Certificate

Patent No. 6,841,601 B2

Patented: January 11, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Joseph M. Serpico, Palm Harbor, FL; Scott G. Ehrenberg, New Port Richey, FL; Gary Wnek, Midlothian, VA; and Liwei Cao, Odessa, FL.

Signed and Sealed this Twenty-first Day of February 2006.

DAVID W. WU
*Supervisory Patent Examiner*
Art Unit 1713